June 30, 1936.    C. L. EKSERGIAN    2,045,902
COMPOSITE ARTILLERY WHEEL
Original Filed April 4, 1932
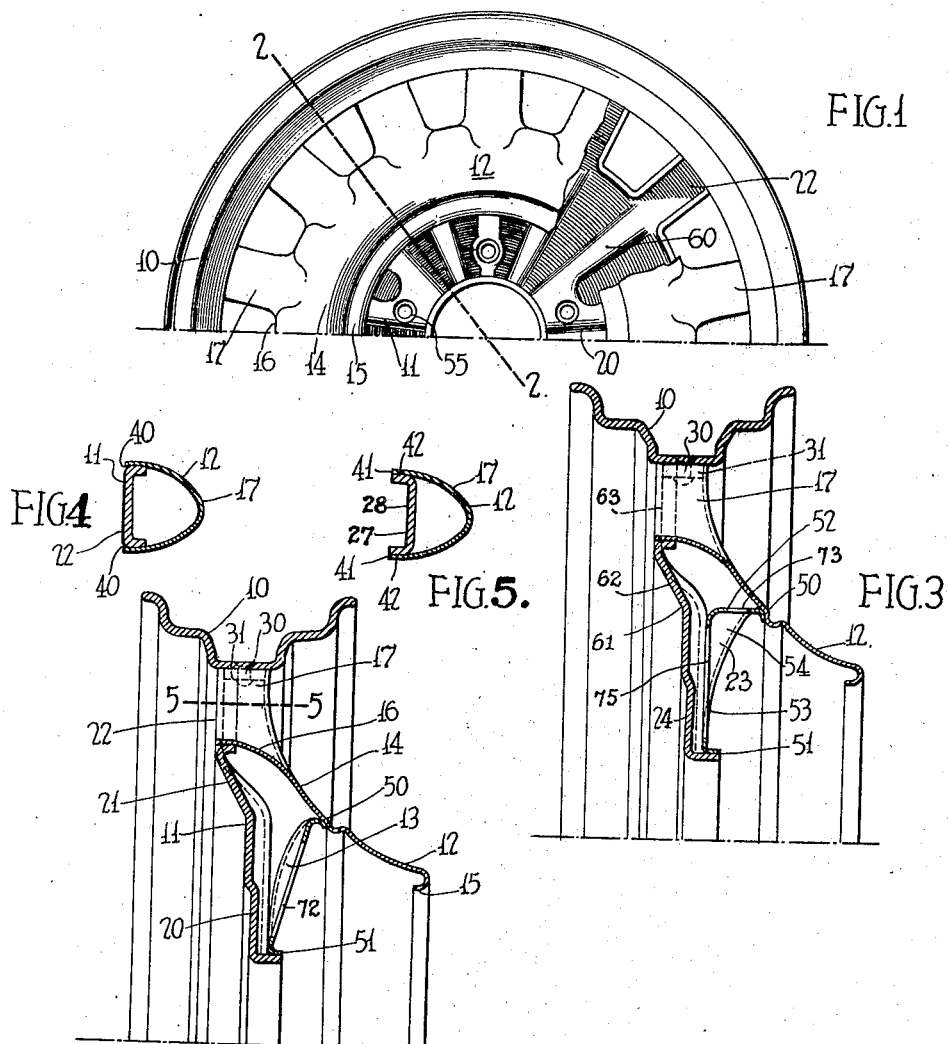
INVENTOR.
CAROLUS L. EKSERGIAN.
BY John P. Tarbox
ATTORNEY.

Patented June 30, 1936

2,045,902

UNITED STATES PATENT OFFICE 2,045,902

COMPOSITE ARTILLERY WHEEL

Carolus L. Eksergian, Detroit, Mich., assignor to Budd Wheel Company, Philadelphia, Pa., a corporation of Pennsylvania Original application April 4, 1932, Serial No. 603,084. Divided and this application May 9, 1934, Serial No. 724,647. Renewed January 2, 1936

7 Claims. (Cl. 301—9)

This invention relates to vehicle wheels and more particularly to artillery wheels of the pressed metal type and is a division of my application Serial No. 603,084.

Artillery wheels of the sheet metal type known to the prior art have been known to fail in the spoke sections and the nave portions. The wheel structure of this invention eliminates the above mentioned difficulties and results in a wheel of superior strength capable of sustaining loads of many times the previously considered safe loading.

An object of the invention is to provide a hollow sheet metal artillery wheel which may be entirely closed and, in which access may be had to the outer ends of the spokes from positions adjacent to the hub. Another object of the invention is to provide a double-stamping spider in which the inner stamping assumes the major part of the wheel load and the outer stamping constitutes substantially only a fairing.

A further object of the invention is to provide a wheel that shall be simple and durable in construction, economical to manufacture and effective in its operation. Another object of my invention is to construct an artillery wheel having a nave portion of substantial radius which gives a pleasing appearance from an artistic standpoint.

Among the objects of the invention may be enumerated the desire to fabricate from pressed metal a vehicle wheel of great strength and light weight; the construction of a vehicle wheel utilizing inner members of heavier gauge metal, being main, i. e., major load carrying members, and outer members being shrouding, fairing or other outer appearance members of lighter gauge metal; the fabrication in the hub zone of the wheel body by a plurality of interconnecting annuli for the purpose of greater strength in this area and the transfer of any loading from the outer member to the inner member; the formation of a wheel body complementally from dissimilar spider stampings, one of which includes a mounting flange.

Other objects of my invention will readily appear from a reading of the sub-joined specification and claims.

I attain the foregoing objects and others not specifically enumerated by forming the wheel of several elemental parts comprising a rim member, a rear spider member, a front spider member and an interconnecting annulus, each of said parts being preferably of pressed metal.

In practicing the invention, a relatively light-gauge outer stamping is provided with a hub cap receiving portion, an inwardly diverging conical or nave portion and spoke portions of rear-opening channel section.

A heavy gauge inner stamping, or spider, is provided with a mounting plate portion, an inwardly-diverging cone or nave having a forwardly turned outer perimeter, spoke portions of front-opening channel section, and radial ribs of rear-opening channel section extending from positions in the spoke portions, across the nave, to positions on the mounting plate.

The spoke and conical portions of the stampings cooperate in axially opposed relation to form spoke members of hollow or tubular section and a nave portion of hollow section. The inner stamping may be of thicker gauge material than the outer stamping and the adjacent parts of the two stampings where secured together may be of different thickness or may be of tapering sections but in each instance the parts are secured so that the outer surfaces are preferably of substantially smooth continuous rounded contours.

The arrangement of parts is such that the inner stamping assumes the major part of the wheel load, the outer stamping is substantially only a fairing but carries the hub cap, and the inner perimeters of the stampings are so axially spaced as to provide access radially through this space through the openings in the annulus and the spokes to the outer ends of the latter, as by tools or electrodes, for securing a rim to the spokes.

The spoke portions of both stampings being of channel section, it is unnecessary to die-draw either of these portions as deeply to provide spokes of proper proportions, as in a single stamping spider. The hollow wheel body is entirely closed, may be made to more closely simulate a wood artillery wheel of almost any desired contour, has few parts, is easy to fabricate and to assemble, and has other advantages.

My invention will be better understood from the subjoined specification and claims when considered in connection with the accompanying drawing, wherein Fig. 1 is an elevation partly broken away of an upper sector of a wheel incorporating features of my invention.

Fig. 2 is an axial cross section of an upper portion of a modified form of wheel corresponding to a section on line 2—2 of Fig. 1 but having additionally in the hub portion the annulus 13.

Fig. 3 is a similar section to Fig. 2 showing a slightly different form of interconnecting annulus.

Figs. 4 and 5 show spoke sections of various cross section forms corresponding to sections along lines 4—4 of Fig. 2.

More specifically in the figures I have shown in Fig. 1 a wheel comprising a rim member 10 herein shown as being of a conventional drop center type, a rear spider 11 containing a mounting flange portion, and a front spider 12. The front spider comprises an annular nave portion 14 terminating axially in a hub cap securing portion 15 and extending radially into an interrupted portion 16 from which is pressed a plurality of spoke portions 17 of axially facing channel cross section. The inner or load sustaining spider 11 comprises a mounting plate portion 20, having bolt holes 55, a plurality of spoke portions 22 of substantially channel cross section, the said parts being interconnected by an annular nave portion 21 of conical form. The rim 10 is secured to the wheel body by riveting or welding in any of several forms, for example, in the manner of Figs. 2 and 3 wherein rivets 30 secure the spoke end closure member 31 to the rim. It is readily understood that the fastening by welds is equally feasible in place of rivets.

The two spider members comprising the front and rear members or secured together in their spoke portions preferably by welds, in Fig. 4 by arc welding at the points 40 and Fig. 5 by arc welding at points 41 or spot welding at 42. In the forms of construction of Figs. 2 and 3, the spoke portion of the rear spider 11 is received within the spoke simulating portion of the front spider member 12 and secured thereto. For purposes of greater strength, an annulus 13 is interposed between the two spider members and in the form of Fig. 2, at an annular zone of securement 50 with the outer spider and at 51 with the inner spider. The annulus 13 may be perforated as shown at 72. This form transfers any loading of the outer spider to the inner spider member and stiffens the wheel body in the hub portion without detracting from the appearance of the wheel. The welding at points 50 and 51 may be by means of arc or spot welding, and in some instances may even be by rivets, although this latter method may interfere with the general appearance of the wheel body.

In Figure 3, an annulus 23 of varying section is disclosed having an axially extending portion 52, which may be perforated at 73, and a radially extending portion 53, which may be perforated at 75, and angularly corrugated portions 54. The wheel body is of the hub demountable type having two spider members and an annulus. The rear spider 61 has a mounting flange portion 24 provided with a plurality of annularly spaced bolt hole openings, the conical portion 62, and spoke portions 63. The front spider 12 being shown exactly the same as in the other figures of the drawing but this member may be varied according to the exigencies of use.

The rear spider member may have the spoke portions thereof of either inwardly 22, or outwardly as 27—28, opening channel section as seen respectively in Figs. 4 and 5, and this stamping may be of heavier gauge than the front stamping. Additionally, either of the stampings may be drawn or tapered in section to provide variously desired strength characteristics in the wheel. The hub flange and nave portions of the rear spider may be readily ribbed as at 60, for purposes of stiffening the mounting flange and disseminating wheel loads over a gradually changing section of varying structural characteristics. The conical portions provide the necessarily high strength characteristics of the cone section and the front member may be of thin gauge stainless steel and of varying contour. After and during assembly, the parts are so arranged as to provide access to the interior of the wheel body and the annulus may be perforate or imperforate according to the needs and exigencies to a particular sphere of wheel utilization.

The annuli 13 and 23 are shown perforated at 72 and 73, respectively, in Figs. 2 and 3. This annulus transfers any load carried by the front member 12 to the mounting flange portion. The outer spider 12 and rim 10 are similarly shown, by way of ordinals in the various figures, and the same ordinals are used for the same parts. Any form of usual mounting nuts and bolts or studs may be adapted to the wheel assembly. The form of the stampings readily lend themselves to easy drawing operations and the preservation of a better grain texture in the metal. The sections shown provide varying strength characteristics for different wheel uses such that Fig. 4 shows a spoke section of closed box cross sections of somewhat different strength characteristics, from that of Fig. 5 which shows a box section spoke having the characteristics of double channels as well as open and closed channels, the various forms showing oppositely or similarly facing channel sections. The construction of the annulus in some forms provides a composite mounting plate construction of great strength. It will be readily apparent that the subject matter of my invention is susceptible of modification and change within its true spirit and scope and the disclosures are merely for purpose of illustration and not by way of limitation.

While by way of illustration and example I have described my invention in connection with preferred embodiments thereof as to structure, and the preferred manner of practicing it, it will be obvious to those skilled in the art, after understanding the foregoing, that various changes and modifications may be made without departing from the spirit or scope of the appended claims and I aim to cover all such modifications and changes.

What I claim is:

1. An artillery metal wheel comprising a main body portion including an annular nave and a plurality of spokes of channel shaped cross section projecting from said nave, and a wheel shroud including an annular nave portion and a plurality of wheel shrouding members projecting radially outwardly from the annular nave portion, said wheel shrouding members receiving said spoke members and being secured thereto, the nave portion of the shroud member being spaced from the nave portion of the main body, and a reinforcing annulus interconnecting said nave portions.

2. An artillery metal wheel comprising a main body portion including an annular nave and a plurality of inwardly facing spokes of channel shaped cross section projecting from said nave, and a wheel shroud including an annular nave portion and a plurality of wheel shrouding members projecting radially outwardly from the annular nave portion, said wheel shrouding members receiving said spoke members and being secured thereto, the nave portion of the shroud member being spaced from the nave portion of the main body, and a reinforcing annulus interconnecting said nave portions.

3. An artillery metal wheel comprising a main body portion including an annular nave and a plurality of outwardly facing spokes of channel shaped cross section projecting from said nave, and a wheel shroud including an annular nave portion and a plurality of wheel shrouding members projecting radially outwardly from the annular nave portion, said wheel shrouding members receiving said spoke members and being secured thereto, the nave portion of the shroud member being spaced from the nave portion of the main body, and a reinforcing annulus interconnecting said nave portions.

4. An artillery metal wheel comprising a main body portion including an annular nave and a plurality of spokes of channel shaped cross section projecting from said nave, and a wheel shroud including an annular nave portion and a plurality of wheel shrouding members projecting radially outwardly from the annular nave portion, said wheel shrouding members receiving said spoke members and being secured thereto, the nave portion of the shroud member being spaced from the nave portion of the main body, and a reinforcing annulus of alternate arcuate and angular section interconnecting said nave portions.

5. A pressed metal artillery wheel of the demountable bolted on type comprising, in combination, a main body including a radially extending bolting on flange, an annular nave portion and a plurality of axially facing channel section spoke portions projecting therefrom, a shrouding member of deeply dished conical form having a substantially conical nave portion, and spoke simulating portions having their main bodies merging with the radial outermost portion of the nave and extending therebeyond, said spoke and spoke simulating portions being in secured relation and complementally forming hollow spokes, and an annulus interconnecting the nave portion of said shrouding member and the radially innermost portion of said bolting-on flange.

6. In a vehicle wheel, the combination of a rim member, a plurality of projections secured to said rim member and arranged whereby to engage spoke portions of a wheel body, an annular member having a radially extending flange portion and an axially extending hub shell portion, a main load carrying spider member having an annular mounting flange, a conically extending portion and radially extending spoke portions outwardly thereof, said mounting flange of said spider and the flange of said annular member being in secured relation to provide the hub mounting flange of the wheel body, and a shrouding spider member having open U-section spokes and a substantially conically extending nave and hub snell portion, said spoke portions arranged to provide complementally with the spoke portions of said load carrying member closed tubular spokes whereby to lock said rim member to said wheel body by means of the projections thereon, and said hub shell portion being secured to the hub shell portion of said annular member whereby to form an integral wheel body.

7. A rim supporting hub demountable sheet metal vehicle wheel of the artillery type having a rim and a sheet metal body portion comprising opposed dis-similarly shaped sheet metal spider members, one of said sheet metal spider members comprising a radially extending mounting flange, a conically extending annular portion and a plurality of radially extending spoke portions, the other of said members having a plurality of radially extending spoke portions, and a conically extending nave portion and a substantially axially extending hub shell portion, the axially outer extremity of the nave and the hub shell portion being spaced from the mounting flange portion of the other spider member, means securing said wheel body to the rim, and an anulus interconnecting the common portion of the nave and hub shell of the one spider member to the mounting flange portion of the other spider member.

CAROLUS L. EKSERGIAN.